US006201791B1

(12) United States Patent
Bournas

(10) Patent No.: US 6,201,791 B1
(45) Date of Patent: Mar. 13, 2001

(54) METHOD AND APPARATUS FOR MEASURING FLOW CAPACITY OF AND DETERMINING THE OPTIMAL WINDOW SIZE OF A COMMUNICATIONS NETWORK

(75) Inventor: Redha M. Bournas, Chapel Hill, NC (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 08/959,941

(22) Filed: Oct. 29, 1997

(51) Int. Cl.[7] .................................................. H04L 12/26
(52) U.S. Cl. ............................................. 370/234; 370/255
(58) Field of Search .................................. 370/229–241, 370/250–253, 247

(56) References Cited

U.S. PATENT DOCUMENTS

| 4,769,810 | * | 9/1988 | Eckberg, Jr. et al. ............... 370/232 |
| 5,063,562 | * | 11/1991 | Barzilai et al. ...................... 370/231 |
| 5,274,625 | | 12/1993 | Derby et al. . | |
| 5,680,326 | * | 10/1997 | Russ et al. ................................. 714/4 |
| 5,708,656 | * | 1/1998 | Noneman et al. .................... 370/335 |
| 5,923,849 | * | 7/1999 | Venkatraman ........................ 370/355 |

FOREIGN PATENT DOCUMENTS 6125363    5/1994  (JP) .

OTHER PUBLICATIONS

Chen et al. "The Analysis of the Application of ARQ Mechanism in ATM Network" Communication Technology Proceedings. ICCT'96., 1996, pp.263–266.*
"An Appoximation Method for Capturing Complex Traffic Behavior in High–speed Networks", Special Issue of the Performance Evaluation Journal (1994) by: L. Gun.
"Windowed Ping: An IP Layer Performance Diagnostic", Proc. INET 94'/JENC5, By: M. Mathis.
"Window Based Bandwidth Adjustments", IBM Technical Disclosure Bulletin, By: G. Galand, L. Gun, P. Scotton & T. Tedijanto, vol. 37, No. 10, Oct. 1994.
"Dynamic Computation of TCP Maximum Window Size for Directly Connected Hosts", IBM Technical Disclosure Bulletin, By: K. Chang & V. O. Mehta, vol. 37, No. 04A, Apr. 1994.
"Engineering Trans–oceanic 44 Mb/s TCP/IP Networks", Computer Networks and ISDN Systems 25 (Suppl. 3) 1994, By: Guy T. Almes.
"Communications Architectures and Protocols", Published in Computer Communication Review, vol. 21, No. 4, Sep., 1991.
"Congestion Avoidance and Control", University of California, Lawrence Berkeley Laboratory, By: Van Jacobson, 1998.

* cited by examiner

*Primary Examiner*—Chau Nguyen
*Assistant Examiner*—Jasper Kwoh
(74) *Attorney, Agent, or Firm*—Jerry W. Herndon

(57) ABSTRACT

The idle capacity of a packet network channel is dynamically estimated by transmitting only a single window of test packets at whatever window size is presently in use on the channel and by measuring the time intervals between acknowledgments (the inter-acknowledgment time) of adjacent packets. This value is used, for example, to dynamically allocate the idle bandwidth to applications. Preferably, an average value for the inter-acknowledgment time interval is calculated from all of the acknowledgment intervals associated with the window of packets. The idle capacity of the channel is then calculated from the formula $C=1/I_{Avg}$, where C is the idle capacity in packets per second and $I_{Avg}$ is the average acknowledgment time between packets. Additionally, the same parameters that are collected to calculate the idle capacity are used to calculate the optimal window size, also on a dynamic basis.

21 Claims, 4 Drawing Sheets

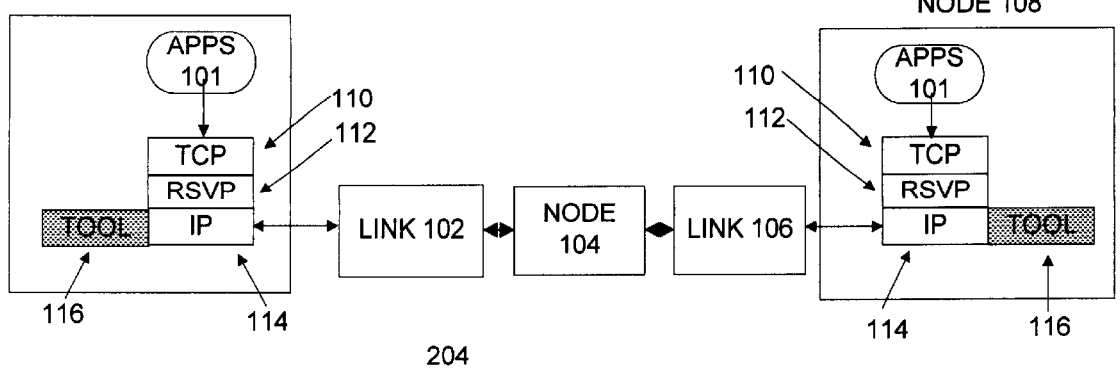
FIG. 1
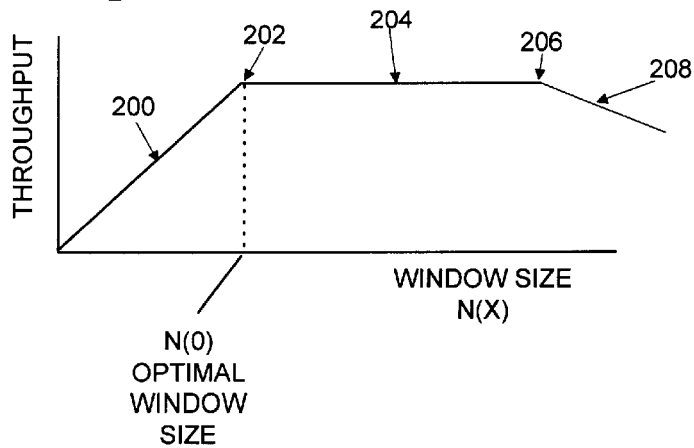
FIG. 2
FIG. 8
| 1 | 800 - SENT | 802 - RECEIVED | 804 - RETRANSMIT COUNTER |
|---|---|---|---|
| 2 | SENT | RECEIVED | RETRANSMIT COUNTER |

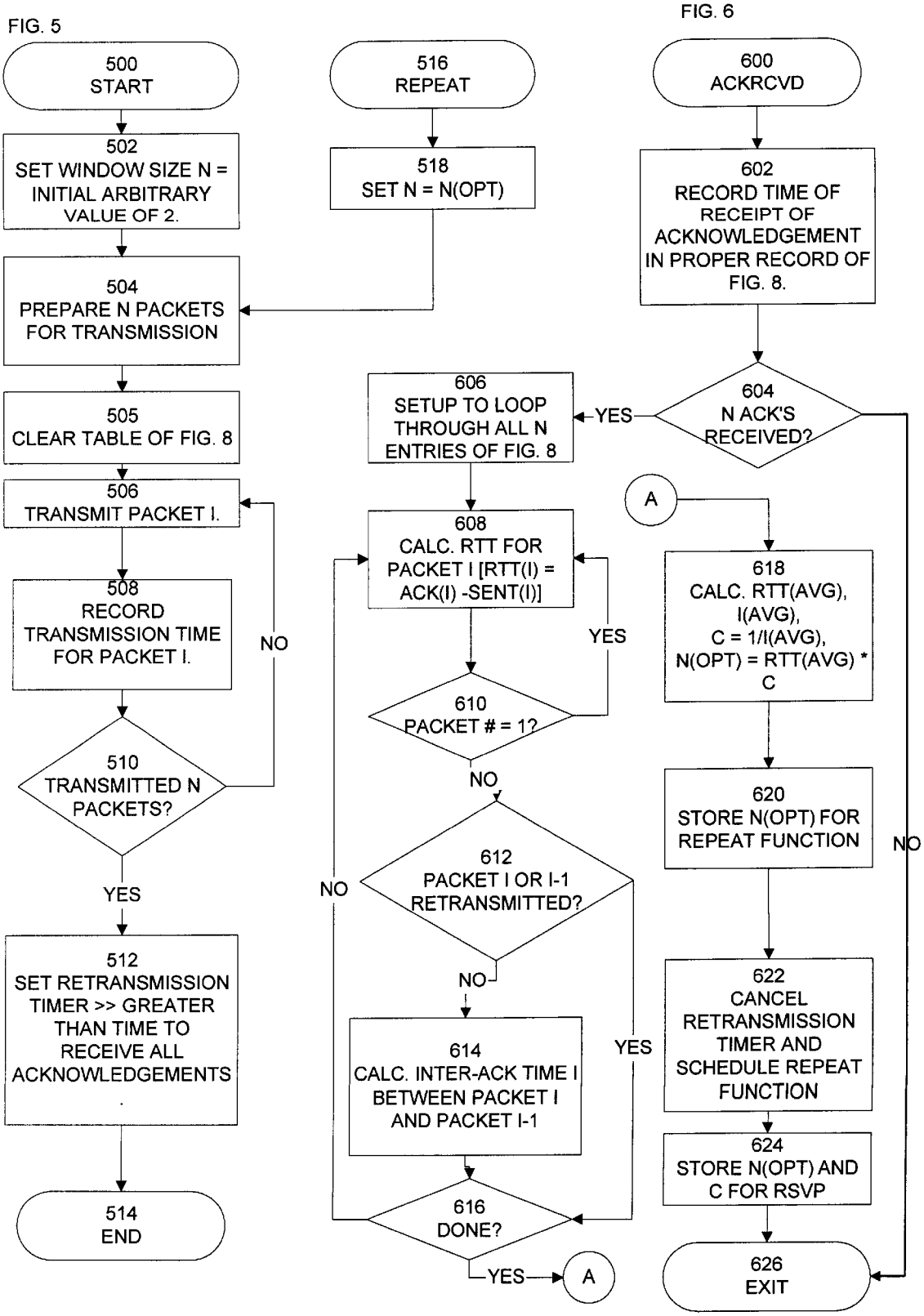

METHOD AND APPARATUS FOR MEASURING FLOW CAPACITY OF AND DETERMINING THE OPTIMAL WINDOW SIZE OF A COMMUNICATIONS NETWORK

FIELD OF THE INVENTION

The invention relates to networking in general and specifically for dynamically estimating the idle bandwidth capacity of a packet switched communications channel in a communications network for purposes such as bandwidth reservation and allocation. Once the idle capacity of a channel is determined, it is possible to estimate the optimal window size at which the channel should operate and to further improve the operation of the channel, while at the same time reducing the possibility that the bandwidth measurements will push the channel into congestion and packet loss. The idle capacity is used to make bandwidth guarantees to applications; the optimal window size is used to help achieve maximum throughput of the channel.

BACKGROUND OF THE INVENTION

There is a need to determine dynamically the idle capacity of a packet communication channel in which the actual network nodes and links which form the channel cannot be predicted or controlled apriori. The Internet is such a network. The set of Internet nodes and links that form an Internet channel between a source node and a destination node anywhere in the world is unpredictable and depends on a number of variables such as the time the channel is formed and the state of spanning trees located in the various nodes that are selected as the channel is formed. Knowledge of the idle channel bandwidth at any given time is needed, for example, to allocate or reserve the bandwidth for different applications or for various purposes. It is also desirable to determine this idle bandwidth and the optimal window size on a channel that is in use, without significantly increasing the probability of channel overload and packet loss.

The effective bandwidth of a channel depends on the window size that is in use on the channel. Window size is defined as the maximum number of packets that can be in transit on a channel at any given time. One can think of the operation of a channel as a source node initially transmitting N packets, where N equals the window size, and thereafter transmitting one packet for each packet acknowledgment that is received from the destination node. In this way, one window's worth of packets are maintained in transit on the channel.

There is an optimal window size for every channel and this optimal size varies depending on channel load, among other things. When a channel is operating at below its optimal window size, queuing is not occurring at the nodes that form the channel and there is idle bandwidth available. A channel operating at above its optimal window size is experiencing queuing at the channel nodes. If the channel load is pushed too far, the queue of the worst performing node (the bottleneck node) in the channel will overflow and packet loss will be experienced.

To my knowledge, there is no known feasible way at the present time of dynamically determining the idle capacity of a channel. However, there are known methods of estimating idle capacity over a relatively large period of time by sending a large number of packets much greater that a typical window size. This characteristic of transmitting many windows worth of packets is what makes the known methods undesirable for dynamic use. Early methods of measuring idle channel capacity rely on sending packets from a source node at a constant rate and estimating performance from the arrival rate of acknowledgments and the number of packets lost. However, these methods are unreliable. At packet rates less than the processing rate of the bottleneck node in the channel, no queue is formed and performance is measured at less than the optimal performance of the channel. At packet rates even slightly greater than the processing rate of the bottleneck node, the queue quickly overloads and there is not a sustained queue in the channel from which reliable data can be obtained by use of these algorithms. Further, as mentioned, large numbers of packets are required, which detracts from their use dynamically.

Mathew Mathis addressed the problem of overload in the measuring process as described in his 1994 paper "Windowed Ping: An IP Layer Performance Diagnostic". Mathis uses a sliding window size control to plot the performance of a channel in terms of packets in transit (window size) versus packets delivered and lost. However, Mathis's method also requires the transmission of large numbers of packets at different window sizes to plot the static performance of the channel.

Both of these methods of estimating idle capacity require the transmission of many windows worth of packets. This consumes resources and may further the tendency of a channel to congest. Thus, the known methods are not suitable for dynamically determining or estimating channel bandwidth. Further, if the optimal window size is not being used, then there is idle channel time introduced at the bottleneck node of the channel as illustrated in FIG. 3 and this tends to worsen the accuracy of bandwidth estimates.

SUMMARY OF THE INVENTION

In accordance with the invention, it has been determined that the idle capacity of a channel can be reliably estimated by transmitting only a single window of packets at whatever window size is presently in use on the channel and by measuring the time intervals between acknowledgments of adjacent packets. Preferably, an average value for the inter-acknowledgment time interval is calculated from all of the acknowledgment intervals associated with the window of packets. The idle capacity of the channel is then calculated from the formula $C=1/I_{Avg}$, where C is the idle capacity in packets per second and $I_{Avg}$ is the average acknowledgment time between packets. This method of determining idle capacity is effective, even though the channel is presently operating at less than or greater than its optimal window size. This is important, since in real situations, the window size actually in use on a channel and for which a window of test packets is transmitted is usually arbitrarily selected and is usually less than the optimal bandwidth of the channel.

Preferably, all of the window of test packets is transmitted in immediate succession and results are calculated after acknowledgments are received for each of the test packets. However, even though this transmits far less than the number of packets onto the channel than prior known methods, it still introduces traffic into a channel already in use and may lead in some cases to undesirable congestion and packet loss. An alternative method may be used in some cases to meter the window of test packets over short intervals to further reduce the tendency to congest and interfere with real traffic. For example, if a window size happened to be ten packets, it would be satisfactory in most circumstances to meter the ten packets in groups of 2 or more over a number of relatively short intervals.

The same parameters that are collected to calculate the idle capacity are also used to calculate the optimal window size on a dynamic basis and each value of optimal window size is used by the protocol components of the system that controls the actual window in use to improve the performance of a channel. Since the idle channel capacity and optimal window size changes over time, preferably the estimates are periodically updated and refined.

BRIEF DESCRIPTION OF THE DRAWING

In the drawing,

FIG. 1 shows an illustrative network useful for practicing the invention, comprising a source node and a destination node and a channel including an intermediate node linking the source and destination nodes;

FIG. 2 shows an illustrative example of a throughput graph of a channel in terms of window size;

FIG. 5 shows an illustrative flowchart of test packet transmissions at a source node concerned with estimating the idle capacity of a channel;

FIG. 6 shows an illustrative flowchart of the steps taken on receipt of test packet acknowledgments at the source node in calculating the idle channel capacity and optimal window size;

FIG. 8 shows an illustrative table format used for storing data relating to the times of transmission of test packets and the times of receipt of the corresponding acknowledgments, which data is used to calculate the idle bandwidth and optimal window size.

DETAILED DESCRIPTION

Figure 3:
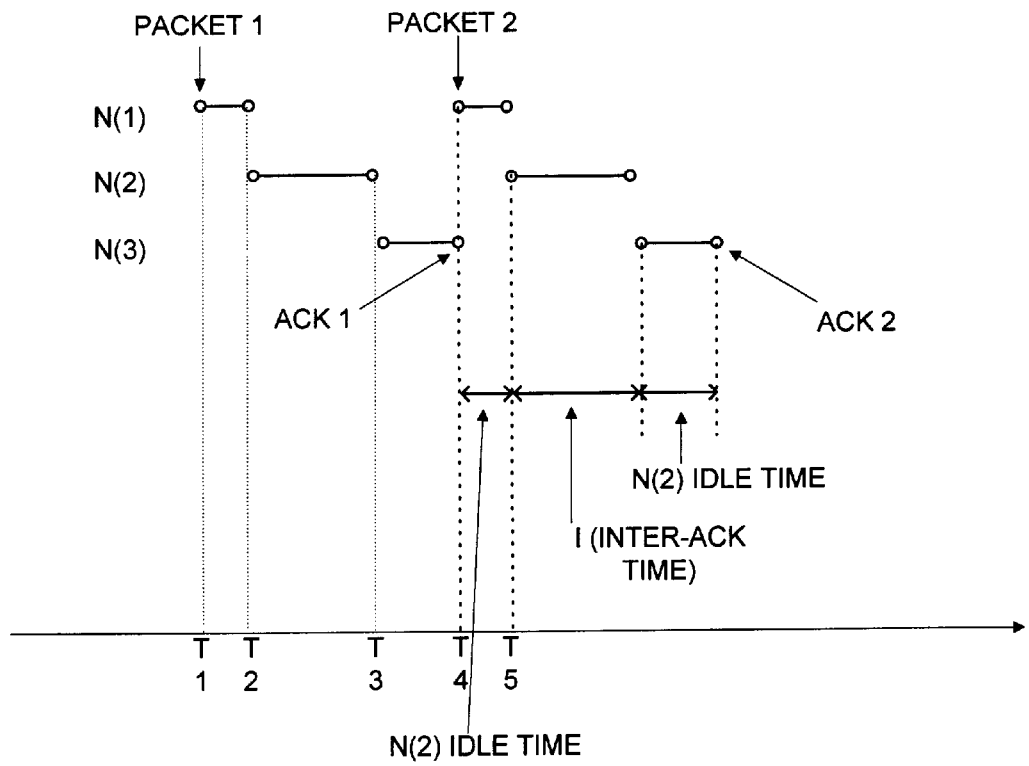
FIGS. 3 and 4 show packet transmission and acknowledgment timing diagrams for use in explaining the operation of packet channels.

FIG. 1 shows a network channel between applications 101 in a source node 100 and a destination node 108. The channel consists of links 102 and 106 and an intermediate node 104. This channel is illustrative and should not be taken as limiting in any way. The problem is to measure, or estimate, the idle capacity of this channel at any given time and preferably dynamically. Such measurements are needed in bandwidth reservation schemes for high-speed networking to guarantee quality of service (QoS) for certain applications and for other purposes. It is assumed for the purposes of discussion that each node is running a TCP/IP protocol stack for channel communications. TCP/IP is well known. In fact, it is the protocol of the Internet and no particular details of its protocol operation are deemed necessary for an understanding of the invention. Additionally, the invention applies to other protocols that are used for packet transmission.

The TCP/IP protocol stack is shown in each of the nodes 100 and 108 as a TCP layer 110 that serves general applications 101, a resource reservation component (RSVP) 112 that, among other functions, controls the window size used on the channel and allocates or guarantees bandwidth chosen by the applications, and an IP protocol layer 114 for controlling packet transmission at the link level. In accordance with the invention, the IP layer also communicates with a software measuring tool 116 that performs the dynamic determination of idle capacity and optimal window size. Tool 116 is shaded to emphasize that it represents the novel aspects of FIG. 1. Each node of the network contains one or more computers (not 10 explicitly shown in FIG. 1 for simplicity) of a general or special nature to execute the software associated with the applications, the protocol stack and the tool for estimating the idle channel bandwidth.

FIG. 2 shows a graph of the normal throughput (capacity) of a channel in terms of window size in use. If the channel is empty, FIG. 2 represents the total channel capacity. If the channel is carrying traffic, Fig, 2 represents the idle capacity remaining on the channel. The part of the curve labeled 200 represents the capacity of the channel for window sizes that are too small to initiate queuing at any of the channel nodes. This represents idle capacity of the channel and, accordingly, channel throughput increases over this part of the curve as window size is increased. The knee of the curve occurring at 202 of FIG. 2 represents the optimal window size. This is the point at which packet queuing begins to occur in one or more nodes of the channel. Along the part of the curve labeled 204, the queues in one or more channel nodes are increasing in size. Because of the queuing, the throughput on the channel tends to remain constant along this part of the curve. At point 206 of the curve, queue overflow starts to occur and, as a result, packet loss and reduced throughput begins to occur. This is illustrated by that portion of the curve labeled as 208. It should also be noted that the optimal window size $N_{opt}$ tends to change on a channel according to a number of parameters such as the number of nodes in a channel and the length of the channel. The problem then is, at any given time, to find the idle throughput value represented by the stable portion of the curve at 204, and additionally, to determine $N_{opt}$ at any given time, all according to the level of traffic the channel is already carrying at a that time.

The theoretical basis for the invention is first presented.

It is assumed that the average data rates of the links between channel nodes are larger than the average processing data rates of the channel nodes. In equilibrium, this implies that the average rate of acknowledgment arrivals at a source node is equal to this maximum average throughput. These two rates also equal the average rate of packet departures from the source node. This is because when the system is in equilibrium, a new packet is injected in the network only when an acknowledgment arrives from the destination node; it also means that there is a full window of packets in transit on the channel. We first start with some notation.

$d_n$=Departure time from the source node of the nth packet.

$a_n$=Arrival time of the nth acknowledgment packet from the destination.

$I_n$=Inter-acknowledgment time interval between packets n+1 and n.

$RTT_n$=Round trip time of packet n.

Then we have the following two expressions:

$$I_n = a_{n+1} - a_n \quad [1]$$

$$RTT_n = a_n - d_n \quad [2]$$

The sustainable idle capacity of a channel is defined as $$C = \lim_{n \to \infty} \frac{n}{a_n - d_1}. \quad [3]$$

The expression inside the limit on the right hand side of the above equality is the average throughput achieved along the channel when sending a file of size n packets. If I denotes the inter-acknowledgment time between packets, then $$I = \lim_{n \to \infty} \frac{\prod_{k=1}^{n} I_k}{n}. \qquad [4]$$

After some straightforward arithmetic, we have:

$$C=1/I \qquad [5]$$

It can be shown that $I_k=S_{max}$ for all integers k, where $S_{Max}$ is the average packet processing time at the bottleneck node.

From equation 4 then:

$$I=S_{Max}, \qquad [6]$$

and combining with equation 5 we have $$C=1/S_{max}. \qquad [7]$$

This shows that it is sufficient to determine a representative value of the inter-acknowledgment time interval between successive packets to determine an estimate of the idle capacity of a channel.

Figure 4:
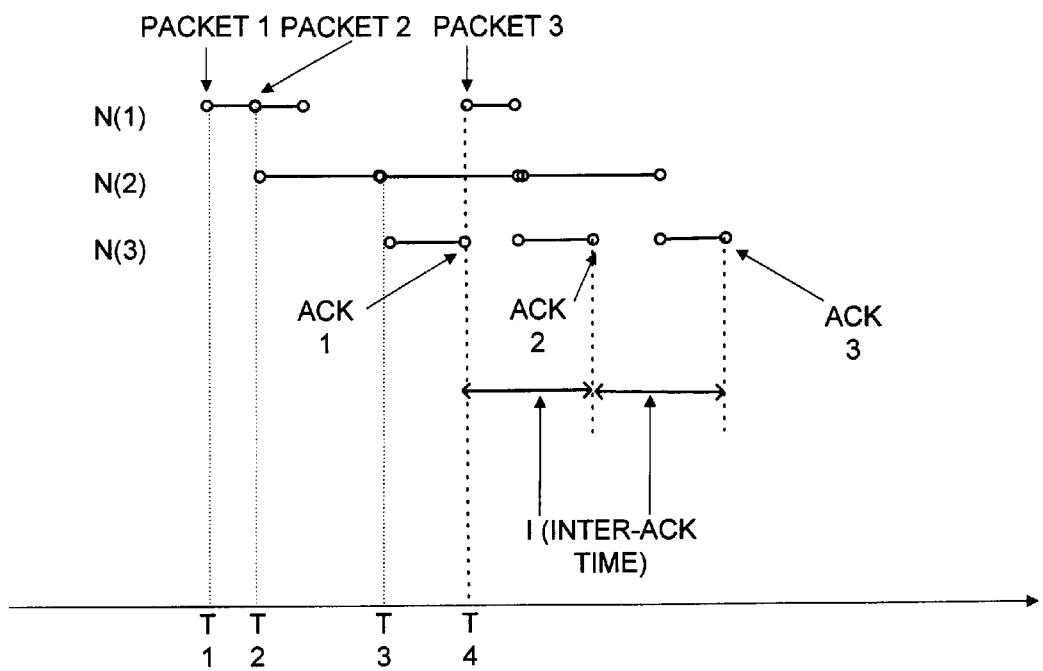

FIGS. 3 and 4 give further insight into the operation of a channel consisting of three nodes, a source node N1, a channel node N2 and a destination node N3. This example channel has been arranged for illustrative purposes to have an optimal window size of two packets. In FIG. 3, the channel is operating at a sub-optimal window size of one packet. To maintain a window's worth, or less, of packets on the channel, the protocol rules state that after an initial window's worth of packets are transmitted, the source node N1 cannot transmit another packet until it receives an acknowledgment from a previously transmitted packet. Thus, node N1 begins by transmitting packet 1 (a windows worth in this example) at time t1. Node N2 receives packet 1 at t2 and immediately begins to process it. Node N3 receives packet 1 at t3 and immediately begins to process it. Node N3 finishes processing packet 1 at t4 and immediately returns an acknowledgment to node N1. Therefore, node N1 transmits packet 2 essentially at t4. Node N2 cannot begin to process packet 2 until it receives it at t5. The time difference between t5 and t4 represents wasted channel time at node N2 and, in this example, node N2 is the bottleneck node. The wasted time at N2 is caused by running the channel at other than the optimal window size.

FIG. 4 shows the same example as FIG. 3, except that the channel is now assumed to be operating at its optimal window size of two packets. Thus, node N1 initially starts at t1 by transmitting two packets, packet 1 and packet 2 (a windows worth). Node N2 receives packet 1 and begins to process it at t2. At t3, N2 transmits packet 1 to node N3 and begins to process packet 2. Node N3 completes the processing of packet 1 at t4 and returns an acknowledgment to node N1, at which time node N1 transmits packet 3 to node N2. In this example, notice that there is no longer any idle time at node 2, as in FIG. 1.

We now describe the operation of the measuring tool 116 of FIG. 1 to determine the idle capacity of a channel and its optimal window size as discussed above. In the implementation described below, use is made of the Windowed Ping program described in the Mathis paper mentioned earlier. Windowed Ping is used as a convenience, because it implements a packet sequence number algorithm in which transmitted packets are assigned sequence numbers and returning acknowledgments identify the packet sequence number with which they are associated. This ability is used, as will be seen, to account and compensate for lost test packets. However, this preferred embodiment does not make use of the sliding window described in the Mathis paper.

Figure 7:
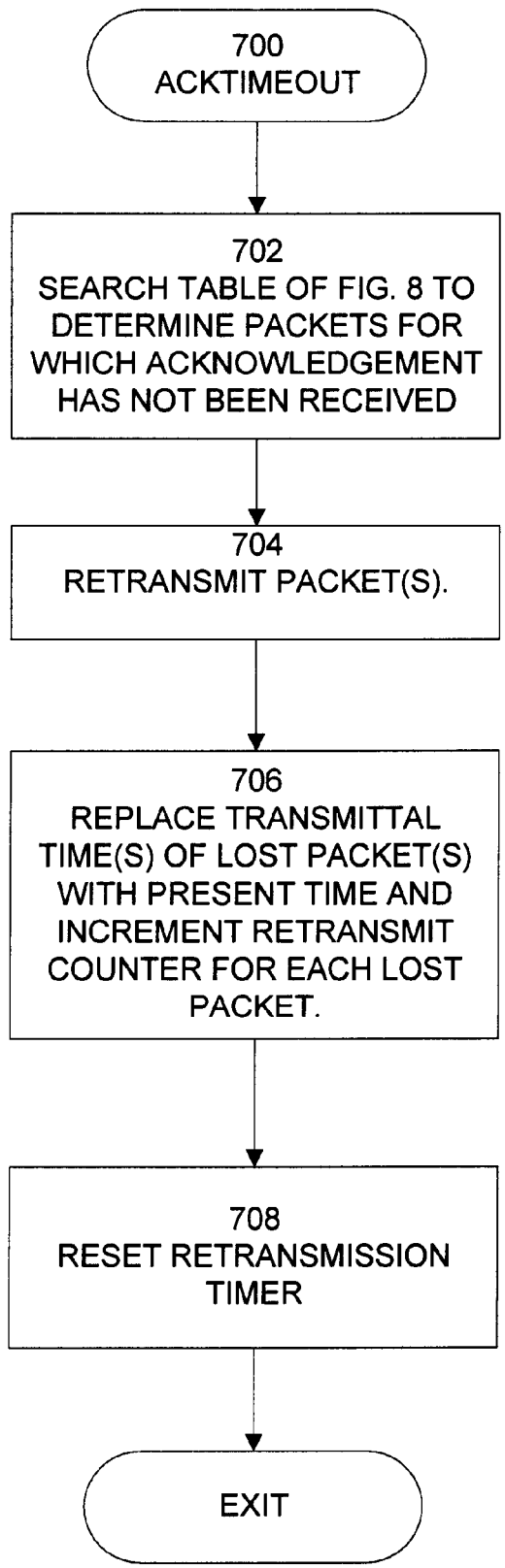
FIG. 7 shows an illustrative flowchart of the steps taken at the source node when a packet acknowledgment timeout occurs.

When the tool 116 is first initiated, an entry is made to program label Start 500 in FIG. 5. Step 502 initially selects an arbitrary window size, which is two in this illustrative example. The initial window size of two is selected because this should minimize the probability of the test packets pushing the channel into an overflow condition. Step 504 prepares two (N) test packets for transmission from source node 100 to destination node 108 of FIG. 1. This step includes adding a sequence number to each test packet. Step 505 clears the table in FIG. 8 so that it does not contain old data. Steps 506, 508, 510 and 512 constitute a loop in which the N test packets are transmitted in immediate succession to the destination node. For each test packet, step 508 records in the "SENT" field 800 of FIG. 8 the time of packet transmission for later calculations. The entry is made into the record of the table corresponding to the sequence number of the test packet. For example, the transmission time of test packet 1 is recorded in record 1, that for test packet is recorded in record 2, and so on. This is important in this illustrative embodiment, because records ordered by sequence number are used in conjunction with a RETRANSMIT counter field 804 of the table subsequently to properly account in the calculations for test packets which were lost at least once and had to be retransmitted. This is described in more detail below with respect to FIG. 7. In this example, only two records are shown in FIG. 8. When the N test packets have been transmitted, step 512 initiates a Retransmission Timer to a value that is much greater than the expected time to receive an acknowledgment for the last of the test packets. If the timer expires before all acknowledgments are received, then an entry is made to the program of FIG. 700 to detect which packet or packets were lost and to retransmit them. This portion of the measuring tool 116 now terminates for the time being at label End 514 of FIG. 1. The tool now waits for the return of an acknowledgment packet or an acknowledgment timeout. At the receiving node 108, the corresponding tool 116 receives the test packets, retrieves the sequence number from each test packet as it is received and returns an acknowledgment which includes the sequence number.

Assuming that an acknowledgment is received in short order, that acknowledgment causes a program entry to AckRcvd 600 in FIG. 6. Step 602 obtains from the acknowledgment packet the sequence number of the associated test packet and uses this sequence number to locate the storage record in FIG. 8 associated with the test packet. Step 602 then records in the record the time of receipt of the acknowledgment. Step 604 determines if a total of N acknowledgments have been received, thus indicating that calculations may now proceed. However, there is the possibility that one or more test packets may get lost which will prevent N acknowledgments form ever being received at step 604 if this situation is not detected. If a test packet should get lost, then step 604 will not be satisfied even when the acknowledgment for packet N is received. Eventually the retransmission timer set at step 512 will expire, causing an entry at program label AckTimeout 700 in FIG. 7. In this event, step 702 determines the sequence number or numbers of lost packets by searching the FIG. 8 records for times of received acknowledgments. Records with no recorded time of receipt of an acknowledgement have been lost. Step 704 retransmits a test packet with the same sequence number as each lost packet. Step 706 then replaces the time of transmittal of each test packet in the appropriate packet record from step 602 with the present time and increments the RETRANSMIT counter for each such packet. Step 708 restarts the retransmission timer. When the acknowledgment from these retransmitted packets arrive, step 604 is satisfied and processing of results begins at step 606 to calculate the idle capacity and optimal window size of the channel at the present time. If a retransmitted packet also gets lost, the retransmission timer will eventually expire again, and the above steps will be repeated until eventually N acknowledgments are received for each of the N test packets.

Step 606 sets up a loop counter to loop through each of the N records. Step 608 uses the recorded times of transmission and acknowledgment receipt to calculate the round-trip-time (RTT) for the present ith packet of the loop. Next, the inter-acknowledgment time between packets i and i−1 is calculated. This requires special processing in case the present loop packet number is 1 or in case a packet was retransmitted. For packet number 1, there is no inter-acknowledgment time to be calculated. Therefore, step 610 returns to step 608 to process the next packet if the present packet number being processed is packet 1. If the present packet being processed is not packet 1, step 610 passes to step 612, which determines if either of the present packet i or the former packet i−1 was retransmitted and, if so, how many times. If adjacent packets are retransmitted a different number of times, then a calculation of the inter-acknowledgment time using the values in FIG. 8 for either of these records would yield invalid results. Therefore, if either packet was retransmitted and the adjacent packet was not retransmitted or retransmitted a different number of times as indicated by the value in the RETRANSMIT counter field of FIG. 8, step 612 skips the inter-acknowledgment time calculation by moving directly to step 616. If the present and immediately preceding packets were not retransmitted, or retransmitted the same number of times, step 614 calculates the inter-acknowledgment time $I=A_i-A_{i-1}$, where $A_i$ is the acknowledgment time of the ith packet from FIG. 8. Step 616 next determines if the loop is finished. If not, step 616 returns to step 608 to process the next packet. If all test packets have been processed, the remaining steps calculate the overall results of the set of test packets. Step 618 uses the individual values for RTT to calculate an average $RTT_{Avg}$. Step 618 uses the inter-acknowledgment times for each packet for which an inter-acknowledgment time was calculated at step 614 to calculate an average inter-acknowledgment time $I_{avg}$. Step 618 then calculates the idle capacity of the channel from the formula $C=1/I_{avg}$ packets per second. Finally, step 618 estimates the optimal window size at the present time from the formula $N_{opt}=RTT_{Avg}*C$. This value of $N_{opt}$ is stored for the next iteration of test packets at step 620. Step 622 cancels the retransmission timer and schedules a re-entry to the Repeat function at 516 to run the test packets again at a later time. Finally, step 624 stores the newly calculated values of $N_{opt}$ and C for use by the packet layer component RSVP 112 of FIG. 1 in allocating bandwidth and for honing the performance of the channel.

At a later time as scheduled by step 622, the function Repeat 516, when entered, reads the calculated value of $N_{opt}$ from the previous iteration and uses that value to determine (step 518) the number of test packets for the next iteration. In this manner, the accuracy of the calculations should, in general, converge toward more accurate values.

In accordance with conventional practice in the software industry, It is possible to store and distribute the software associated with the tool 116 by means of magnetic media such as floppy disks, CD-ROMs, magnetic tape, and the like.

It is to be understood that the above described arrangements are merely illustrative of the application of principles of the invention and that other arrangements may be devised by workers skilled in the art without departing from the spirit and scope of the invention.

What is claimed:

1. A method of estimating the idle capacity of a packet network channel between a network source node and a network destination node, comprising the steps at the source node of transmitting one or more test packets to the destination node via the channel, where the number of test packets approximately equals the window size presently in use on the channel, determining from the test packet acknowledgments that are returned to the source node a value I representing the average time interval between acknowledgments, and calculating the estimated idle channel capacity from the formula C=1/I.

2. The method of claim 1 further comprising the steps of determining a value RTT representing the round trip time of test packet transmission and receipt of the corresponding acknowledgment, and calculating from the round trip time the estimated optimal window size of the channel from the formula $N_{opt}=RTT*C$, where $N_{opt}$ is the estimated channel optimal window size.

3. The method of claim 2 wherein the step of determining the value RTT further comprises the step of calculating an average value $RTT_{Avg}$ from the round trip time of each of the test packets and using $RTT_{Avg}$ to calculate the estimated optimal window size.

4. The method of claim 1 wherein the step of transmitting the test packets further comprises the step of delaying the transmission of each of a group of successive test packets by a selected amount of time.

5. The method of claim 1 or claim 2 or claim 3 or claim 4 further comprising the step of allocating channel bandwidth to applications based on the calculated estimate of idle channel capacity.

6. The method of claim 2 or claim 3 further comprising the step of adjusting the window size used on the channel based on the calculated estimate of the optimal window size.

7. The method of claim 2 or claim 3 further comprising the step of periodically repeating the transmission of test packets and the calculation of the estimated idle channel capacity using the last calculated estimate of optimal window size to determine the number of test packets for each iteration.

8. Apparatus at a packet network source node for estimating the idle capacity of a packet network channel between the source node and a network destination node, comprising means for transmitting one or more test packets to the destination node via the channel, where the number of test packets equals the window size presently in use on the channel, means for determining from the test packet acknowledgments that are returned to the source node a value I representing the average time interval between acknowledgments, and means for calculating the estimated idle channel capacity from the formula C=1/I.

9. The apparatus of claim 8 further comprising means for determining a value RTT representing the round trip time of test packet transmission and receipt of the corresponding acknowledgment, and means for calculating from the round trip time the estimated optimal window size of the channel from the formula $N_{opt}=RTT*C$, where $N_{opt}$ is the estimated channel optimal window size.

10. The apparatus of claim 9 wherein the means for determining the value RTT further comprises means for calculating an average value $RTT_{Avg}$ from the round trip time of each of the test packets and means for calculating the estimated optimal window size from $RTT_{Avg}$.

11. The apparatus of claim 8 wherein the means for transmitting the test packets further comprises means for delaying the transmission of each of a group of successive test packets by a selected amount of time.

12. The apparatus of claim 8 or claim 9 or claim 10 or claim 11 further comprising means for allocating channel bandwidth to applications based on the calculated estimate of idle channel capacity.

13. The apparatus of claim 9 or claim 10 further comprising means for adjusting the window size used on the channel based on the calculated estimate of the optimal window size.

14. The apparatus of claim 9 or claim 10 further comprising means for periodically repeating the transmission of test packets and the calculation of the estimated idle channel capacity using the last calculated estimate of optimal window size to determine the number of test packets for each iteration.

15. A media for storing software code, which code when loaded and executed on a computer at a network source node is capable of controlling the source node to perform a method of estimating the idle capacity of a packet network channel between the source node and a network destination node, the method comprising the steps of transmitting one or more test packets to the destination node via the channel, where the number of test packets equals the window size presently in use on the channel, determining from the test packet acknowledgments that are returned to the source node a value I representing the average time interval between acknowledgments, and calculating the estimated idle channel capacity from the formula $C=1/I$.

16. The media of claim 15 wherein the method further comprises the steps of determining a value RTT representing the round trip time of test packet transmission and receipt of the corresponding acknowledgment, and calculating from the round trip time the estimated optimal window size of the channel from the formula $N_{opt}=RTT*C$, where $N_{opt}$ is the estimated channel optimal window size.

17. The media of claim 16 wherein the method step of determining the value RTT further comprises the step of calculating an average value $RTT_{Avg}$ from the round trip time of each of the test packets and using $RTT_{Avg}$ to calculate the estimated optimal window size.

18. The media of claim 15 wherein the method step of transmitting the test packets further comprises the step of delaying the transmission of each of a group of successive test packets by a selected amount of time.

19. The media of claim 15 claim 16 or claim 17 or claim 18 wherein the method further comprises the step of allocating channel bandwidth to applications based on the calculated estimate of idle channel capacity.

20. The media of claim 16 or claim 17 wherein the method further comprises the step of adjusting the window size used on the channel based on the calculated estimate of the optimal window size.

21. The media of claim 16 or claim 17 wherein the method further comprises periodically repeating the transmission of test packets and the calculation of the estimated idle channel capacity using the last calculated estimate of optimal window size to determine the number of test packets for each iteration.

* * * * *